United States Patent [19]

Yamazaki et al.

[11] Patent Number: 4,973,138
[45] Date of Patent: Nov. 27, 1990

[54] LIQUID CRYSTAL DEVICE AND MANUFACTURING METHOD FOR THE SAME

[75] Inventors: Shunnei Yamazaki, Tokyo; Toshio Watanabe; Hidetaka Nakajima, both of Atsugi, all of Japan

[73] Assignee: Semiconductor Energy Laboratory Co., Ltd., Kanagawa, Japan

[21] Appl. No.: 260,605

[22] Filed: Oct. 21, 1988

[30] Foreign Application Priority Data

Oct. 27, 1987 [JP] Japan ................................. 62-270886
Sep. 22, 1988 [JP] Japan ................................. 63-239258
Sep. 22, 1988 [JP] Japan ................................. 63-239259
Sep. 22, 1988 [JP] Japan ................................. 63-239260
Sep. 26, 1988 [JP] Japan ................................. 63-241750

[51] Int. Cl.$^5$ ............................................. G02F 1/133
[52] U.S. Cl. .................................................... 350/344
[58] Field of Search ............................. 350/344, 350 S

[56] References Cited

U.S. PATENT DOCUMENTS 4,362,771 12/1982 Umeda et al. .................. 350/344 X
4,600,273 7/1986 Ohno ................................... 350/336
4,740,060 4/1988 Komura et al. ....................... 350/344

FOREIGN PATENT DOCUMENTS 0050357 4/1982 European Pat. Off. .
0216632 4/1987 European Pat. Off. .
0219242 4/1987 European Pat. Off. .
57-210323 12/1982 Japan .
60-98420 6/1985 Japan .

*Primary Examiner*—Stanley D. Miller
*Assistant Examiner*—Anita Pellman Gross
*Attorney, Agent, or Firm*—Sixbey, Friedman, Leedom & Ferguson

[57] ABSTRACT

An improved liquid crystal device is described. The distance between a pair of substrates is kept constant by means of spacers interposed therebetween. The spacers consist of two kinds of spacers. One kind of spacer is fusible and functions to prevent the distance from expanding. The other kind of spacer is non-fusible and functions to prevent the distance from contracting.

1 Claim, 3 Drawing Sheets

LIQUID CRYSTAL DEVICE AND MANUFACTURING METHOD FOR THE SAME

BACKGROUND OF THE INVENTION

The present invention relates to a liquid crystal device and manufacturing method for the same.

In recent years, ferroelectric liquid crystal materials have attracted the interest of researchers due to their quasi-hysteresis characteristics. The performance of this type of liquid crystal device depends largely on the distance between a pair of substrates in which liquid crystal material is disposed. If there is substantial disparity in the distance between the substrates, the response times of respective constituent cell elements are dispersed, and degradation of display performance and irregular color result.

SUMMARY OF THE INVENTION

It is an object of the present invention to provide a liquid crystal device in which a liquid crystal layer is formed with a constant thickness.

It is another object of the present invention to provide a method of manufacturing liquid crystal devices without causing coming-off of spacers which function to maintain a constant distance between a pair of substrates, and without causing the occurence of void spaces in a liquid crystal layer formed between the pair of substrates.

DETAILED DESCRIPTION OF THE PREFERRED EMBODIMENTS

Figure 1:
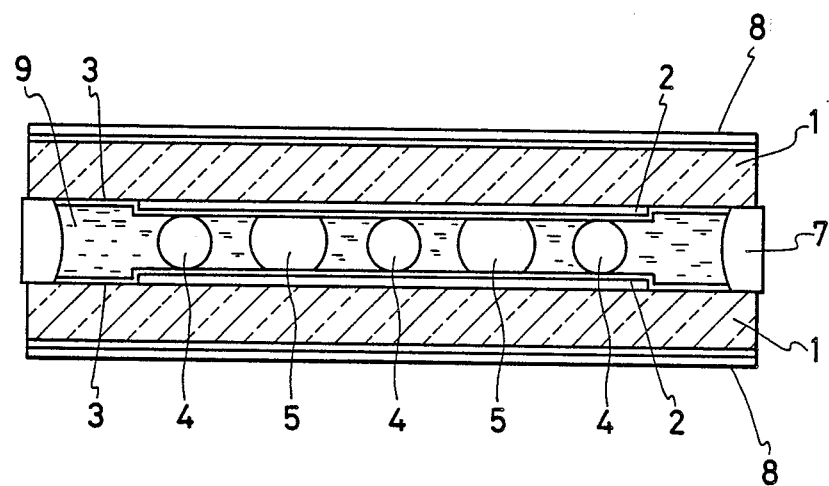
FIG.1 is a cross sectional view showing a liquid crystal device in accordance with the present invention.

Referring now to FIG. 1, a liquid crystal display is illustrated in accordance with the present invention. In the figure, the display comprises a pair of 310 mm×220 mm glass substrates 1, transparent electrode arrangements 2 formed on the opposed insides of the substrates 1 by a known sputtering, orientation control films made of polyimide covering the inside surfaces of the substrates over the electrode arrangement, fusible spacers 5 and non-fusible spacers 4 both interposed between the substrates 1, a sealing member 7 for preventing the loss of liquid crystal material, and a liquid crystal layer 9 made of a ferroelectric liquid crystal material disposed between the substrates 1. For operation, crossed Nicols 8 are placed on both external sides of the displays. The electrode arrangements are provided with two sets of parallel electrode strips in an orthogonal relationship by a known photolithography. Adjacent strips are spaced by distances of 20 microns. Generally speaking, the average diameter of the fusible spacers is 3–5 times larger than that of the non-fusible spacers.

The non-fusible spacers 5 are made of a plurality of segments of a glass fiber. The fusible spacers 4 are made of a plurality of epoxy particles of 5.5 micron diameter (Toraypearl, a trademark of spacers manufactured by Toray Co.). The spacers 4 and 5 are distributed between the substrates 1 by the following procedure. Glass fiber segments of 2.5 microns average diameter and 10 microns average length are mixed with a freon ($CF_2Cl_2$) at 2 gram/liter and sufficiently dispersed by applying ultrasonic vibration. The dispersed fiber freon mixture is sprayed on the surface of a glass substrate. In the same way, the epoxy particles are mixed with and dispersed in freon at a proportion of 1.0 gram/liter, and distributed on the surface of the substrate. On the other hand, an opposed glass substrate is provided at the periphery thereof with a sealing member of a thermosetting resin such as an epoxy adhesive by screen press printing. The two substrates are joined and heated at 180°C. for two hours under a pressure of 2 kg/cm$^2$ in order to fix the fusible spacers 5 and the sealing member 7. Then, an amount of ferroelectric liquid crystal material (CS-1011 manufactured by Tisso Co.) is interposed between the substrates by a vacuum charging method.

By virtue of the two kinds of spacers, the distance between the substrates is maintained constant. The fusible spacers prohibit the expansion of the distance while the non-fusible spacers prohibit the contraction of the distance. In this description, "non-fusible" also means "non-contracting."

The distributed densities of these spacers are controlled by adjusting the spraying time. Average distance (gap) in microns and standard deviation (S.D.) were measured in cases with varied densities of spacers 4 and 5. Following are the experimental results.

| Sample | Density (spacer 5) | Density (spacer 4) | Average Gap(u) | S.D. | Defects |
| --- | --- | --- | --- | --- | --- |
| A | 50-100 | 10-15 | 2.45 | 0.50 | few |
| B | 100-150 | 10-15 | 2.49 | 0.01 | few |
| C | 150-200 | 10-15 | 2.53 | 0.09 | much |
| D | 100-150 | 1-5 | 2.45 | 0.20 | few |
| E | 100-150 | 20-25 | 2.55 | 0.05 | much |

As shown in the above results, samples B and D were good devices. Particularly, sample B was confirmed to have a uniform substrate gap, few defects and little irregular color. Although a glass fiber is used to make the non-fusible spacers in this embodiment, alumina or suitable organic material can be used instead.

Next, a second embodiment will be described. This embodiment is suitable for the case in which the main problem is void spaces which occur in the liquid crystal layer because of the contraction of the liquid crystal material ensuing from cooling at the completion of disposing the liquid crystal. In this case, it is undesired to perfectly prohibit the change of the distance between the pair of substrates. The liquid crystal layer contracts due to the differential temperature during manufacture, and if the change in distance is impossible by virtue of the spacers, void spaces have to occur in the layer to compensate for the contraction of the liquid crystal material. In turn, the liquid crystal layer urges the distance between the pair of substrates to increase during the disposing process thereof.

The spacers used for the second embodiment are made of a resilient fusible material which allows contraction and the expansion to some extent. The construction and the manufacturing process are substantially the same as those of the first embodiment. Uniformity of the distance between the substrates and the orientation of the liquid crystal material were evaluated with varied densities (/mm$^2$) of spacers. Following are the experimental results.

| Sample | Density of Spacers | Uniformity of Distance | Orientation of liquid crystal |
| --- | --- | --- | --- |
| 1 | 1.2 | bad | good |
| 2 | 2.8 | not so good | good |
| 3 | 3.1 | good | good |
| 4 | 4.5 | good | good |
| 5 | 6.9 | good | good |
| 6 | 9.1 | good | good |
| 7 | 12.1 | good | good |
| 8 | 14.8 | good | good |
| 9 | 15.5 | not so good | good |
| 10 | 17.3 | not so good | not so good |
| 11 | 19.5 | bad | not so good |

Figure 2:
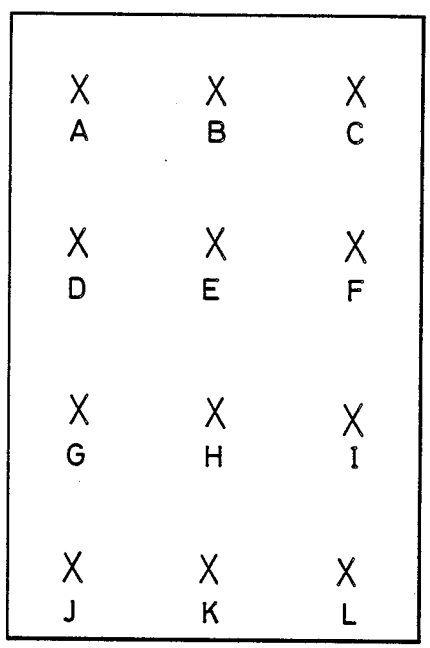
FIG. 2 is a diagram showing the points of a liquid crystal device at which distances were measured in order to evaluate the disparity of the substrate gap of the liquid crystal device in accordance with the present invention.

In the case of sample 1, spacers came off from the surface of the substrate during the disposing of liquid crystal into the space between the pair of substrates, and eventually the distance became unequal. Sample 2 followed suit but the number of coming-off spacers was smaller than that of sample 1. In samples 9, 10 and 11, the distances were increased. In samples 10 and 11, the orientation of liquid crystal was disturbed. Following is data of the distances measured in microns at the points as shown in FIG. 2 for samples 1, 5 and 10. Accordingly, the desirable density of spacer is 3 to 15 mm$^{-2}$.

| Point | Sample 1 | Sample 5 | Sample 10 |
| --- | --- | --- | --- |
| A | 2.4 | 2.1 | 2.3 |
| B | 2.6 | 2.2 | 2.4 |
| C | 2.5 | 2.2 | 2.4 |
| D | 2.4 | 2.1 | 2.6 |
| E | 3.2 | 2.2 | 2.7 |
| F | 3.0 | 2.3 | 2.9 |
| G | 2.9 | 2.2 | 2.9 |
| H | 3.1 | 2.3 | 2.8 |
| I | 3.0 | 2.2 | 2.5 |
| J | 2.7 | 2.2 | 2.3 |
| K | 2.5 | 2.2 | 2.4 |
| L | 2.3 | 2.1 | 2.3 |

The conspicuous difference between the first and the second embodiments is the number of the spacers. The spacer 5 of the first embodiment is such that no expansion is allowed, and therefore coming-off of the spacers is very likely, and eventually the number of the spacers must be increased. In the case of the second embodiment, the spacers can absorb the expansion of the distance between the substrates and therefore the necessary number of the spacers is small.

Uniformity and void spaces were evaluated in cases with varied degree of shrinkage (contraction/expansion degree) of the spacers. The results are as below.

| Sample | Degree of Shrinkage | Uniformity | Void Space |
| --- | --- | --- | --- |
| 1 | 5.0(%) | good | exist |
| 2 | 8.3 | good | exist |
| 3 | 11.4 | good | none |
| 4 | 18.4 | good | none |
| 5 | 22.5 | good | none |
| 6 | 30.2 | good | none |
| 7 | 33.7 | good | none |
| 8 | 36.4 | not so good | none |
| 9 | 40.5 | bad | none |
| 10 | 48.3 | bad | none |

From the above results, the preferred degree of shrinkage ranges from 10% to 35%. Samples 8, 9 and 10 were not acceptable because of expansion of the distance due to the high degree of shrinkage. Following is data of the distances measured in microns at the points as shown in FIG. 2 for samples 1, 5 and 10.

| Point | Sample 1 | Sample 5 | Sample 10 |
| --- | --- | --- | --- |
| A | 2.1 | 2.1 | 2.2 |
| B | 2.9 | 2.2 | 2.5 |
| C | 2.1 | 2.3 | 2.4 |
| D | 2.2 | 2.3 | 2.6 |
| E | 2.1 | 2.3 | 2.8 |
| F | 2.1 | 2.2 | 3.0 |
| G | 2.2 | 2.2 | 2.8 |
| H | 2.1 | 2.1 | 2.7 |
| I | 2.0 | 2.2 | 2.7 |
| J | 2.1 | 2.3 | 3.0 |
| K | 2.1 | 2.2 | 2.7 |
| L | 2.2 | 2.2 | 2.4 |

In practice, spacers having varied degrees of shrinkage can be prepared by making combination use of a mixture of plural kinds of spacers having different degrees of shrinkage. For instance, an effective 27.5% degree is obtained by use of first spacers of 5% degree and second spacers of 50% degree at 1:1 proportion. Following is data of the distances measured in microns at the points as shown in FIG. 2 in cases with the combination use, the use of the first spacers only and the use of the second spacers only.

| Point | Combination | First Spacer | Second Spacer |
| --- | --- | --- | --- |
| A | 2.1 | 2.0 | 2.2 |
| B | 2.1 | 2.1 | 2.4 |
| C | 2.2 | 2.0 | 2.5 |
| D | 2.1 | 2.1 | 2.9 |
| E | 2.2 | 2.1 | 2.8 |
| F | 2.1 | 2.0 | 2.5 |
| G | 2.2 | 2.0 | 2.7 |
| H | 2.1 | 2.0 | 2.6 |
| I | 2.2 | 2.1 | 2.4 |
| J | 2.2 | 2.0 | 2.5 |
| K | 2.1 | 2.1 | 2.3 |
| L | 2.2 | 2.0 | 2.5 |

The expansion of the mated substrate and ensuing excess charge of liquid crystal material can be avoided by employing the following method for disposing liquid crystal material.

Figure 3:
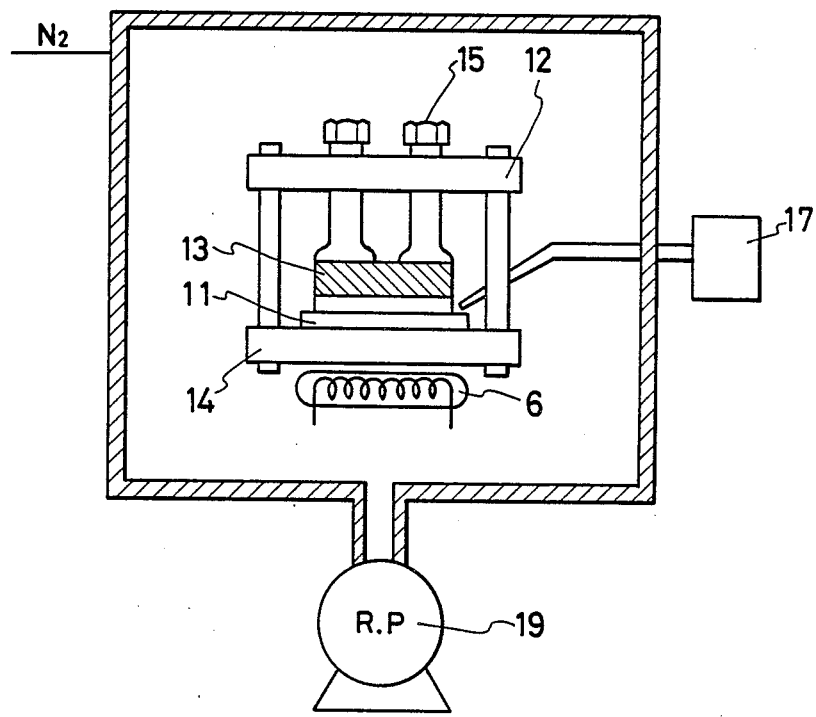
FIG. 3 is a schematic diagram showing an apparatus for disposing a liquid crystal material between a pair of substrates of a liquid cyrstal device.

FIG. 3 is a schematic diagram showing an apparatus for disposing liquid crystal material between a pair of substrates of a liquid crystal device. The apparatus comprises a vacuum chamber 10, a vacuum pump 19 for evacuating the vacuum chamber, a press 12 equipped with torque screws 15, a pair of plates 12 and 14 having opposed smooth inside surfaces which are finely oriented parallel with each other, an accmulator 7 containing liquid crystal material therein and adapted to pour the liquid crystal material into the space between the pair of substrates, and a heater 16 located just below the plate 14.

A liquid crystal device in advance of the disposing procedure is placed between the pair of plates 12 and 14 and pressed by rotating the torque screws 15 at 1 Kg/cm$^2$. In this condition, the pressure in the chamber 10 is reduced by the vacuum pump 19 to $1 \times 10^{-4}$ Torr. The temperature of the device is elevated at the same time to 150° C. by means of the heater. Then, an amount of liquid crystal material such as a ferroelectric liquid crystal is poured into an inlet port provided at the periphery of the liquid crystal device, and the pressure in the chamber is returned to an atmospheric pressure by leaking N$_2$ gas thereinto at 20 cc/min. Following is data of the distances measured in microns at the points as shown in FIG. 2 in cases in which liquid crystal is disposed into the liqud crystal device with and without application of a pressure and without a pressure.

| Point | Pressed Device | Non-pressed Device |
| --- | --- | --- |
| A | 2.1 | 2.0 |
| B | 2.4 | 2.0 |
| C | 2.1 | 2.1 |
| D | 2.2 | 2.1 |
| E | 3.4 | 2.0 |
| F | 2.2 | 2.0 |
| G | 2.2 | 2.1 |
| H | 3.5 | 2.1 |
| I | 2.2 | 2.0 |
| J | 2.1 | 2.0 |
| K | 2.4 | 2.0 |
| L | 2.1 | 2.1 |

The present invention is effective particularly when used in ferroelectric liquid crystal devices. In the liquid crystal devices of this type, substantial volume change takes place during operation, and the operational life time is greatly dependent on the resistance to the volume change which may appear in the form of microvibrations. The use of spacers made of a resilient material can absorb such microvibrations. The resilient material may be organic resilient materials or suitable inorganic materials.

While several embodiments have been specifically described, it is to be appreciated that the present invention is not limited to the particular examples described and that modifications and variations can be made without departure from the scope of the invention as defined by the append appendant claims

We claim:

1. A liquid crystal device comprising:
a pair of substrates;
an electrode arrangment formed on the inside surfaces of the pair of substrates;
a liquid crystal layer disposed between said substrates; and
a plurality of spacers distributed between said substrates in order to maintain the distance between said substrates constant,
wherein said spacer consist of two kinds of spacers, one being fusible and other being non-fusible; and
wherein the distribution density of the fusible spacers is 100 to 150 mm$^{-2}$ and that of the non-fusible spacers is 10 to 15 mm$^{-2}$.

* * * * *